United States Patent
Guyomard et al.

(12)

(10) Patent No.: US 6,189,958 B1
(45) Date of Patent: Feb. 20, 2001

(54) REINFORCED METAL/PLASTIC COMPOSITE FRONT PANEL FOR A MOTOR VEHICLE

(75) Inventors: Jean-Nicolas Guyomard, Le Mesnil Fuguet; Jacques Sigonneau, Theuvy Acheres; Eric Cantineau, Paris, all of (FR)

(73) Assignee: Valeo Thermique Moteur, La Verrier (FR)

( * ) Notice: Under 35 U.S.C. 154(b), the term of this patent shall be extended for 0 days.

(21) Appl. No.: 09/555,467

(22) PCT Filed: Sep. 28, 1999

(86) PCT No.: PCT/FR99/02303

§ 371 Date: May 30, 2000

§ 102(e) Date: May 30, 2000

(87) PCT Pub. No.: WO00/18634

PCT Pub. Date: Apr. 6, 2000

(30) Foreign Application Priority Data

Sep. 30, 1998 (FR) .................................................. 98 12231

(51) Int. Cl.[7] .................................................. B62D 25/08
(52) U.S. Cl. .................... 296/194; 296/901; 296/203.02; 180/68.4
(58) Field of Search ............................... 296/194, 203.02, 296/901; 180/68.4

(56) References Cited

U.S. PATENT DOCUMENTS 5,658,041    8/1997   Girardot et al. ..................... 296/194

FOREIGN PATENT DOCUMENTS

| 0 493 158 | 7/1992 | (EP) . |
| 0 658 470 | 6/1995 | (EP) . |
| 2 761331 | 10/1998 | (FR) . |

OTHER PUBLICATIONS

International Search Report dated Jan. 18, 2000.

*Primary Examiner*—Joseph D. Pape
(74) *Attorney, Agent, or Firm*—Morgan & Finnegan LLP

(57) ABSTRACT

The invention concerns a front panel comprising a plastic frame reinforced by a top metal section extending over the whole width of the panel and provided with structure for fixing it to the vehicle structural elements. The section is a directly mounted section and force-fitted on a crosspiece of the plastic frame, both the section and the crosspiece comprising mutually fitting structure and co-operating elements for crimping the section on the crosspiece.

12 Claims, 1 Drawing Sheet

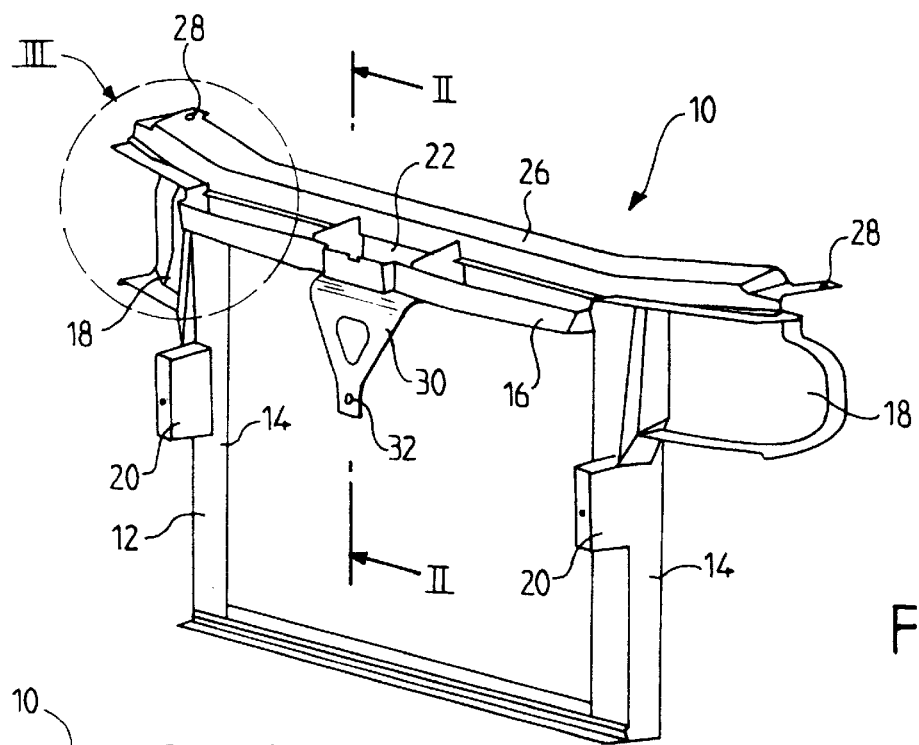
FIG. 1
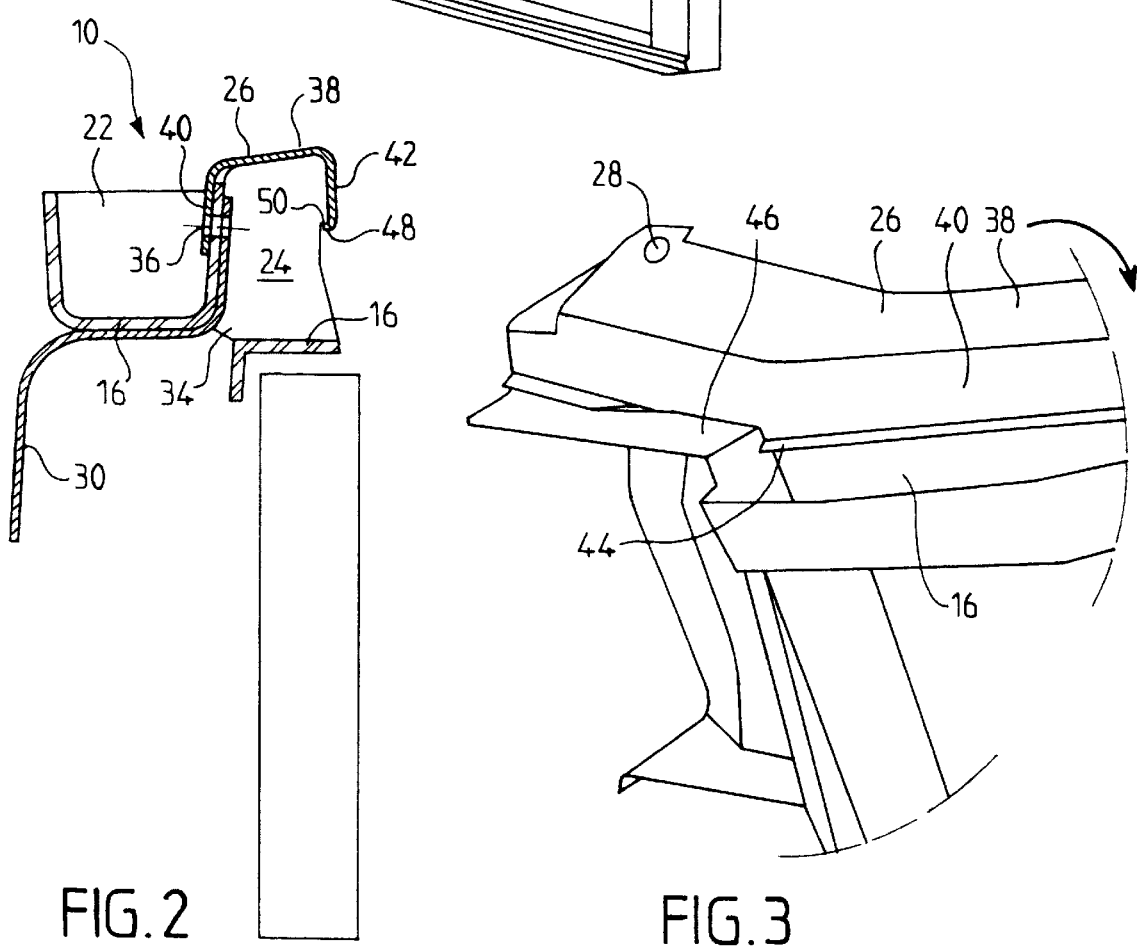
FIG. 2
FIG. 3

# REINFORCED METAL/PLASTIC COMPOSITE FRONT PANEL FOR A MOTOR VEHICLE

BACKGROUND OF THE INVENTION

The present invention relates to a metal/plastic composite front panel for a motor vehicle.

Such a panel is a structural element of the vehicle capable of incorporating various items of equipment of the vehicle such as headlamps, direction indicators, horn, heat exchanger, electric fan unit or entire cooling module, etc.

The front panel, provided in this manner with these items of equipment, forms a single-unit assembly prepared and delivered by the equipment supplier, which is ready to be mounted on the vehicle by the manufacturer.

The mounting of this module is performed by connection to lateral structural elements of the vehicle such as side members, wings or body-frame, then positioning a bumper or a front shield mounted on the module.

As a panel structure which is made entirely of plastic material does not enable the safety requirements of crash tests to be complied with, for the structure of the front panel it is necessary to combine elements made of plastic material (for lightness and low manufacturing cost) and metal elements (for mechanical strength). The method that is currently used consists in deep-drawing a metal sheet to form a section which is then mounted on a plastic support by screwing or rivetting fixing sleeves.

One of the drawbacks of this method is an increase in the weight of the front panel, owing to the double thickness of metal+plastic at the level of the metal reinforcing section.

Moreover, the assembly of the reinforcing section by screwing or rivetting accordingly adversely affects the manufacturing cost of the panel.

BRIEF SUMMARY OF THE INVENTION

One of the objects of the invention is to remove this drawback, by proposing a front panel structure that is both made lighter and reinforced, and which may be produced in accordance with the simplest and most economical possible process.

The panel of the invention is a composite panel of the known type comprising a frame of plastic material reinforced by an upper metal section extending over the whole width of the panel and provided with means for fixing it to structural elements of the vehicle.

According to the invention, the section is a section mounted and force-fitted onto a crosspiece of the plastic frame, whereas the section and crosspiece comprise mutual fitting means and cooperating elements that enable the section to be crimped onto the crosspiece.

According to various advantageous subsidiary characteristics:

- the section is a section with an open cross-section having a general U-shaped section;
- the cooperating elements comprise noses formed on the crosspiece, these noses being capable of locking the section onto the crosspiece by cooperating with a longitudinal edge, flanged by crimping inwards towards the noses, of one of the branches of the U of the section;
- the fitting means comprise shoulders formed on the crosspiece, these shoulders being capable of guiding the section whilst it is being fitted onto the crosspiece by cooperating with a longitudinal edge, flanged outwards towards the shoulder, of one of the branches of the U of the section;
- the crosspiece cooperates with the section by vertical ribs formed on said crosspiece, these ribs having an outer contour matching the inner contour of the section;
- the panel also comprises a vertical metal central jamb, integral with the crosspiece and provided with means for fixing it to a bonnet lock, and this jamb is joined to the section at the site of the means for fixing the jamb to the bonnet lock, the jamb preferably being joined to the section by the other of the said branches of the U;
- the section is formed from a punched and deep-drawn sheet;
- the crosspiece and/or the section are capable of receiving a bundle of electrical cables and/or a cable for the mechanical control of a bonnet lock.

BRIEF DESCRIPTION OF THE DRAWINGS

Other characteristics and advantages of the invention will become apparent from the detailed description of an exemplified embodiment below, given by reference to the attached drawings.

FIG. 1 shows a front panel according to the invention in a front perspective view.

FIG. 2 is a section through a vertical plane along line II—II of FIG. 1

FIG. 3 is an enlarged view of the detail marked III on FIG. 1.

DETAILED DESCRIPTION OF THE INVENTION

On the figures, the reference 10 generally designates the front panel according to the invention, which essentially comprises a frame 12 made of plastic material, comprising in particular vertical posts 14 and a transverse element or crosspiece 16 joining these posts at the upper part.

The frame 12 is made from a suitable thermosetting or thermoplastic synthetic material, for example a glass-fibre reinforced polyamide (of course, this choice is in no way restrictive) moulded, for example, by injection under pressure.

This frame 12 comprises, in a manner known per se, structural parts such as 18 capable of receiving headlamp units or such as 20 for attachment to the beam of the shield or of the bumper. The crosspiece 16 comprises a seat 22 for a bonnet lock, as well as stiffening elements such as ribs 24 (FIG. 2) oriented perpendicularly to the direction of the crosspiece 16.

The panel 10 also comprises a transverse metal section 26 extending over the length of the crosspiece 16 of the plastic frame and provided at its ends with holes 28 for fixing to side members or wings of the vehicle, so as to guarantee the mechanical strength of the body-frame of the latter. This section may, for example, be produced by deep-drawing a sheet, so as to give it the desired profile.

The panel also comprises another metal element, i.e. a central jamb 30 comprising at its lower free end a hole 32 for fixing it to the beam of the shield or of the bumper of the vehicle. At its other end, the jamb 30 is provided with means (not represented) intended to cooperate with the lock of the bonnet of the vehicle which will be placed in the seat 22. With the bonnet closed, the jamb 30 will thus ensure the mechanical connection between the bonnet and the shield to contribute to the overall rigidification of the structure of the vehicle.

This jamb 30 is mounted onto the frame 12 by passing it in a hole 34 (FIG. 2) provided for this purpose, so as to apply it against the front part of the section 16, to which it will be fixed at 36, as well as to the bonnet lock, by any suitable known means.

In a manner that is characteristic of the invention, the section 26 is a U-shaped section comprising (FIG. 2) a central part 38 and two wings 40 and 42. This section is mounted on the crosspiece 15 by simply fitting onto the latter. To achieve this, a forwardly directed projecting edge 44 of the section 26 (FIG. 3) is inserted under a shoulder 46 formed for this purpose on the crosspiece 16. Then the section is flanged, in the direction of the arrow of FIG. 3, onto the crosspiece 16 until it comes to rest against the upper edge of the ribs 24. The section is held in this position, illustrated in FIG. 2, by means of a longitudinal edge 48 which is flanged by crimping so as to be turned inwards. This longitudinal edge 48 comes to cooperate with the matching projecting noses 50 formed on the ribs 24.

The attachment of the section 26 onto the crosspiece 16 may be completed by the attachment at 36, which thus punctiformly interlocks, in the following order: the bonnet lock, the section 26, the front part of the crosspiece 16 and the upper part of the jamb 30, this attachment enabling all these parts to be interconnected.

It will be noted that, owing to the fact that the section 26 rests on the upper edge of the ribs 24, the thickness of the panel at this place is only formed by the thickness of the section 26.

Thus, in contrast to the prior art in which the thickness of the plastic is doubled by that of the metal section, the omission of the thickness of plastic material at this place enables accessibility to the crosspiece 16 to be increased before the mounting of the section 26.

Thus an electric harness or a cable for controlling the lock of the bonnet, or also other components, can be more easily integrated.

What is claimed is:

1. A metal/plastic composite panel for a motor vehicle, comprising a frame made of plastic material reinforced by a top metal section, extending over the width of the panel and provided with means for fixing it to structural elements of the vehicle, wherein the section is mounted and force-fitted onto a crosspiece of the plastic frame, and wherein the section and the crosspiece comprise mutual fitting means and cooperating elements which enable the section to be crimped onto the crosspiece.

2. A panel according to claim 1, wherein the section has an open cross-section having a generally U-shaped section.

3. A panel according to claim 2, wherein the section has a U-shape having a pair of opposed branches the cooperating elements comprise noses formed on the crosspiece, said noses being capable of locking the section onto the crosspiece by cooperating with a longitudinal edge, flanged by crimping inwards towards the noses, of one of the branches of the U of the section.

4. A panel according to claim 1, wherein the fitting means comprise shoulders formed on the crosspiece, the shoulders being capable of guiding the section while it is being fitted onto the crosspiece by cooperating with a longitudinal edge, flanged outwards towards the shoulder, of one of the branches of the U of the section.

5. A panel according to claim 2, wherein the crosspiece cooperates with the section by vertical ribs formed on said crosspiece, the ribs having an outer contour matching the inner contour of the section.

6. A panel according to claim 1 comprising a vertical metal central jamb, integral with the crosspiece and provided with means for fixing it to a bonnet lock, wherein the jamb is joined to the section at the site of the means for fixing the jamb to the bonnet lock.

7. A panel according to claim 3, wherein the jamb is joined to the section by the other of the branches of the U.

8. A panel according to wherein the section is formed from a punched and deep-drawn sheet.

9. A panel according to claim 1, wherein the crosspiece and/or the section are capable of receiving a bundle of electric cables and/or a cable for the mechanical control of a bonnet lock.

10. A panel according to claim 2, wherein the fitting means comprise shoulders formed on the crosspiece, the shoulders being capable of guiding the section while it is being fitted onto the crosspiece by cooperating with a longitudinal edge, flanged outwards towards the shoulder, of one of the branches of the U of the section.

11. A panel according to claim 3, wherein the fitting means comprise shoulders formed on the crosspiece, the shoulders being capable of guiding the section while it is being fitted onto the crosspiece by cooperating with a longitudinal edge, flanged outwards towards the shoulder, of one of the branches of the U of the section.

12. A panel according to claim 6, wherein the jamb is joined to the section by the other of the branches of the U.

* * * * *

UNITED STATES PATENT AND TRADEMARK OFFICE
CERTIFICATE OF CORRECTION

PATENT NO. : 6,189,958 B1
DATED : February 20, 2001
INVENTOR(S) : Jean-Nicolas Guyomard, Jacques Sigonneau and Eric Cantineau Page 1 of 1

It is certified that error appears in the above-identified patent and that said Letters Patent is hereby corrected as shown below:

Column 4,
Line 27, Claim 8 should read: "A panel according to Claim 1, wherein the section is formed from a punched and deep-drawn sheet."

Signed and Sealed this

Twenty-third Day of October, 2001

Attest:

NICHOLAS P. GODICI
Attesting Officer
Acting Director of the United States Patent and Trademark Office